United States Patent
Schwarz

(12) 
(10) Patent No.: US 6,599,182 B1
(45) Date of Patent: Jul. 29, 2003

(54) VENTILATION DOOR SYSTEM

(75) Inventor: Stefan Schwarz, Orion Township, MI (US)

(73) Assignee: Valeo Climatisation, La Verriere (FR)

( * ) Notice: Subject to any disclaimer, the term of this patent is extended or adjusted under 35 U.S.C. 154(b) by 0 days.

(21) Appl. No.: 09/338,109

(22) Filed: Jun. 23, 1999

(51) Int. Cl.[7] ............................................. B60H 3/00
(52) U.S. Cl. ..................... 454/156; 454/160; 454/152
(58) Field of Search .......................... 454/156, 159, 454/160, 161, 152

(56) References Cited

U.S. PATENT DOCUMENTS

| | | | | |
|---|---|---|---|---|
| 2,860,567 A | * | 11/1958 | Wilfert ........................ | 454/160 |
| 4,413,550 A | * | 11/1983 | Piano .......................... | 454/152 |
| 4,512,239 A | * | 4/1985 | Watanabe et al. ........... | 454/152 |
| 4,913,034 A | * | 4/1990 | Ripple et al. ................ | 454/160 |
| 5,129,859 A | * | 7/1992 | Yagi ............................ | 454/155 |
| 5,137,491 A | * | 8/1992 | Ishihara et al. .............. | 454/152 |
| 5,386,704 A | * | 2/1995 | Benedict ....................... | 62/325 |
| 5,462,483 A | * | 10/1995 | Loup .......................... | 454/160 |
| 5,906,541 A | * | 5/1999 | Mizuno ....................... | 454/75 |
| 5,975,191 A | * | 11/1999 | Ohashi et al. ............... | 165/43 |
| 6,019,288 A | * | 2/2000 | Arold et al. ................ | 236/13 |
| 6,338,514 B1 | * | 1/2002 | Arold et al. ............... | 296/24.1 |

* cited by examiner

Primary Examiner—Derek Boles
(74) Attorney, Agent, or Firm—Morgan & Finnegan, L.L.P.

(57) ABSTRACT

In an apparatus for distributing air flowing along a first path, the first path splits into second and third paths, so that both the second and third paths diverge from the first path. The second and third paths are at an angle of less than 180° to one another. A first door, is across the second path; and a second door, is across the third path. A common operating device rotates both doors, such that air is able to flow from the first path into the second and third paths, the flow being dependent on the position of rotation of the doors.

17 Claims, 3 Drawing Sheets

VENTILATION DOOR SYSTEM

FIELD OF THE INVENTION

The present invention relates to an apparatus for distributing air, to an apparatus for controllably rotating first and second doors simultaneously usable in such apparatus, and to a vehicle air conditioning system.

BACKGROUND OF THE INVENTION

Vehicle air conditioning systems commonly have a number of outlet vents along the dashboard for example two face-level vents close to the vehicle centre line, and two further face-level vents situated close to the doors. One known apparatus has a fan propelling air through an evaporator into a mixing chamber where the air cooled by the evaporator mixes with air heated in a heater core. A flow control door is disposed across an outlet region of the mixing chamber, so that when the door is opened, air is provided at the previously-discussed face-level vents.

The known air conditioning apparatus is approximately along the vehicle centre line with air flow in the fore-and-aft direction, and the air outlet at the flow control door impinges on a transverse wall in an outlet chamber having two transverse outlets leading to the above-mentioned further vents, and two spaced aft-facing outlets for the centre-line face vents.

As a result, the fore-and-aft flow direction in the air conditioning apparatus sharply alters to two opposed generally transverse flows in the outlet chamber, with yet a further sharp turn to the fore-and-aft direction for the centre-line face vents.

As is known to those skilled in the art, such flow direction deviations waste energy, thus causing pressure drops, which means that an increased power of fan is needed to provide adequate flow. The movement of air due to such a fan, when incident on a wall transverse to the flow direction is undesirably noisy.

A primary object of the invention is to at least partly overcome the problems of the prior art.

It would be desirable to provide an improved apparatus for dividing a gas flow, such as an air flow, in a single path into two paths. It would further be desirable to provide a vehicle heating or air-conditioning system incorporating such apparatus having limited space, particularly in the direction of flow in the single path, which would mitigate drawbacks of noise, heat loss and excessive pressure drop. It would also be advantageous for such an improved apparatus to be extended to divide each of the two paths into two further paths.

SUMMARY OF THE INVENTION

According to a first aspect of the present invention there is provided apparatus for distributing air, said air flowing along a first path, the apparatus comprising:
  walls defining said first, a second and a third path, the first path bifurcating into the second and third paths, both the second and third paths diverging from the first path and having respective portions disposed at an angle of less than 180° to one another;
  a first door, rotatable about an axis disposed across the said portion of the second path;
  a second door, rotatable about an axis disposed across the said portion of the third path;
  a common operating device for rotating both doors, such that air is able to flow from the first path into the second and third paths, the flow being dependent on the position of rotation of the doors.

In such an apparatus the common operating device may comprise:
  a shaft having a longitudinal axis, the shaft being rotatable about said longitudinal axis;
  an actuator for rotating said shaft;
  a first arm extending from the said shaft for rotation therewith, the first arm having a distal end;
  a first linkage having two ends, one end being connected via a first joint to said distal end of said first arm, the first joint permitting relative rotation in two orthogonal planes between said first linkage and said first arm, and the other end being connected via a second joint to the first door, the second joint permitting relative rotation in two orthogonal planes between said first linkage and said first door; and the apparatus further comprising:
  a second arm extending from the said shaft for rotation therewith, the second arm having a distal end;
  a second linkage having two ends, one end being connected via a third joint to said distal end of said second arm, the third joint permitting relative rotation in two orthogonal planes between said second linkage and said second arm, and the other end being connected via a fourth joint to the second door, the fourth joint permitting relative rotation in two orthogonal planes between said second linkage and said second door.

Preferably the joints within the single operating device comprise either a ball and socket joint or alternatively a part having an aperture, and a hook which is hooked into the aperture.

Conveniently a heater core is disposed in the said first path, whereby air in the said second and third paths would be heatable.

According to a second aspect of the present invention, there is provided an apparatus for controllably rotating a first and a second door simultaneously, comprising:
  a shaft having a longitudinal axis, the shaft being rotatable about said longitudinal axis;
  an actuator for rotating said shaft;
  a first arm extending from the said shaft for rotation therewith, the first arm having a distal end;
  a first linkage having two ends, one end being connected via a first joint to said distal end of said first arm, the first joint permitting relative rotation in two orthogonal planes between said first linkage and said first arm, and the other end being connected via a second joint to the first door, the second joint permitting relative rotation in two orthogonal planes between said first linkage and said first door; and the apparatus further comprising:
  a second arm extending from the said shaft for rotation therewith, the second arm having a distal end;
  a second linkage having two ends, one end being connected via a third joint to said distal end of said second arm, the third joint permitting relative rotation in two orthogonal planes between said second linkage and said second arm, and the other end being connected via a fourth joint to the second door, the fourth joint permitting relative rotation in two orthogonal planes between said second linkage and said second door.

Conveniently the first and second doors each have a respective axis of rotation, said axes being disposed at an angle of between 0° and 180° to one another.

Preferably the joints comprise either a ball and socket joint or alternatively a part having an aperture, and a hook which is hooked into the aperture.

According to a third aspect of the present invention, there is provided a vehicle air-conditioning system comprising:
  walls defining a first, a second and a third path, the first path bifurcating into the second and third paths, both the second and third paths diverging from the first path and having respective portions disposed at an angle of less than 180° to one another;
  an evaporator disposed in the first path;
  a heater core disposed in the first path downstream of the evaporator;
  a first door, rotatable about an axis disposed across the said portion of the second path;
  walls defining fourth and fifth paths, wherein the second path bifurcates into the fourth and fifth paths, the fourth path being offset from the first path and aligned substantially parallel to it, wherein air is able to flow from the second path into the fourth and fifth paths and out into the vehicle interior, flow being dependent on the position of rotation of the first door;
  a second door, rotatable about an axis disposed across the said portion of the third path;
  walls defining sixth and seventh paths, wherein the third path bifurcates into the sixth and seventh paths, the sixth path being offset from the first path and aligned substantially parallel to it, wherein air is able to flow from the third path into the sixth and seventh paths and out into the vehicle interior, flow being dependent on the position of rotation of the second door.

Conveniently the fifth and seventh paths are disposed substantially perpendicular to the first path and at substantially 180° to one another.

Advantageously a common operating device is provided for rotating both doors. Such an operating device suitably comprises:
  a shaft having a longitudinal axis, the shaft being rotatable about said longitudinal axis;
  an actuator for rotating said shaft;
  a first arm extending from the said shaft for rotation therewith, the first arm having a distal end;
  a first linkage having two ends, one end being connected via a first joint to said distal end of said first arm, the first joint permitting relative rotation in two orthogonal planes between said first linkage and said first arm, and the other end being connected via a second joint to the first door, the second joint permitting relative rotation in two orthogonal planes between said first linkage and said first door; and the apparatus further comprising:
    a second arm extending from the said shaft for rotation therewith, the second arm having a distal end;
    a second linkage having two ends, one end being connected via a third joint to said distal end of said second arm, the third joint permitting relative rotation in two orthogonal planes between said second linkage and said second arm, and the other end being connected via a fourth joint to the second door, the fourth joint permitting relative rotation in two orthogonal planes between said second linkage and said second door.

Preferably the joints comprise either a ball and socket joint or alternatively a part having an aperture, and a hook which is hooked into the aperture.

BRIEF DESCRIPTION OF THE DRAWINGS

For a more complete understanding of the invention, reference will now be made to the accompanying drawings, in which.

DESCRIPTION OF THE PREFERRED EMBODIMENTS

Figure 1:
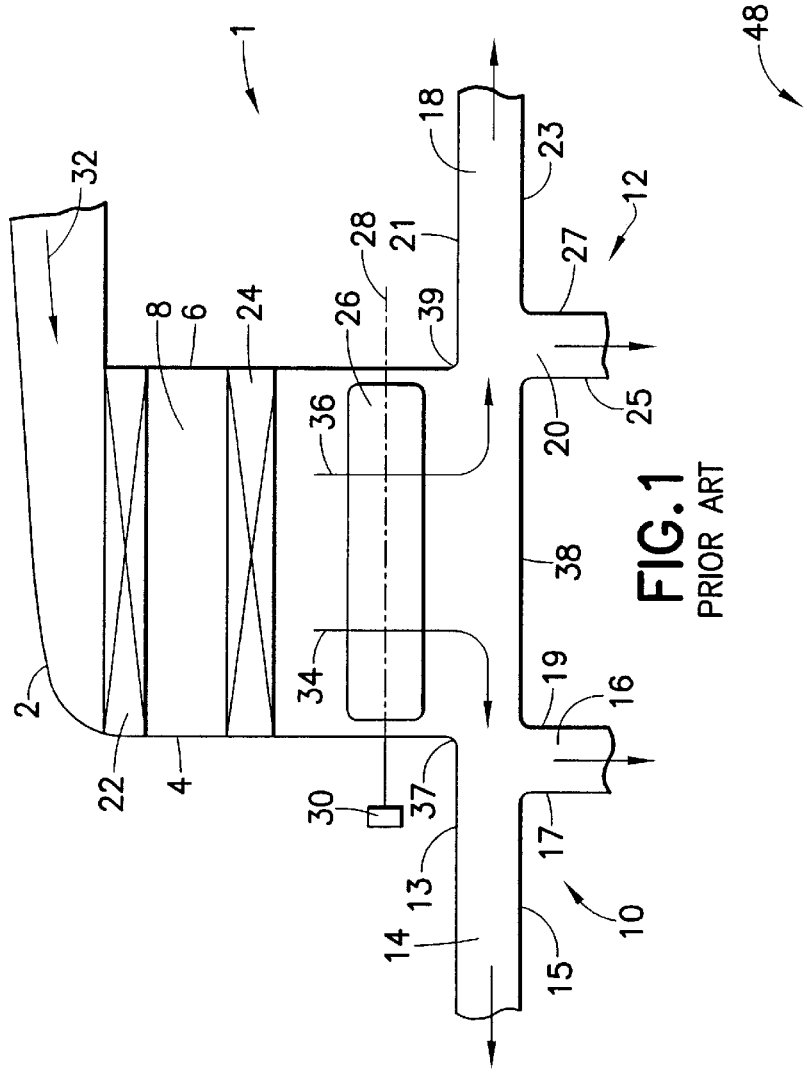
FIG. 1 shows a partial cross-sectional view through a vehicle air-conditioning system according to the prior art, which divides a single air path into two paths and further divides each of these two paths.

In the figures, like reference numerals indicate like parts.

Referring to FIG. 1, a vehicle air-conditioning system has an air inlet duct 2, leading to a first flow path 8 defined by walls 4 and 6 which house an evaporator 22 and a heater core 24. The first flow path is terminated by an end wall 38 and divides into a transverse left path 10 and a transverse right path 12. The left path 10 further divides into a left side path 14 formed from a rear wall 13 and a front wall 15, which is disposed at right-angles to flow path 8, and a left centre path 16, formed form a left wall 17 and a right wall 19, which is disposed parallel to first flow path 8 but laterally offset. Similarly the right path 12 further divides into a right side path 18 formed from a rear wall 21 and a front wall 23, which is disposed at right-angles to flow path 8, and a right centre path 20 formed from a left wall 25 and a right wall 27, which is disposed parallel to flow path 8 but laterally offset. Paths 14 and 18 are disposed at 180° to one another. A flow control door 26 is disposed downstream of the heater core 24 in the first flow path 8. The door is rotatable about its centre axis 28 by means of an actuator 30, between an open position as shown in FIG. 1, and a closed position.

In operation, air enters through inlet duct 2 in the direction of arrow 32 and passes through the device until incident upon the end wall 38. It then divides into two portions as indicated by arrows 34 and 36. A first portion follows the direction of arrow 34 into the left path 10 and a second portion follows the direction of arrow 36 into the right path 12. It can be seen that the shape of the left-hand corner 37 and the right-hand corner 39 just downstream of the door force both portions of air to make right-angular turns in order to flow into paths 10 and 12. The air flow is further affected by end wall 38 which is situated only a short distance from door 26. Air incident upon the end wall 38 results in impact noise and heat loss. The combination of features of path shape also results in excessive pressure drop.

Figure 2:
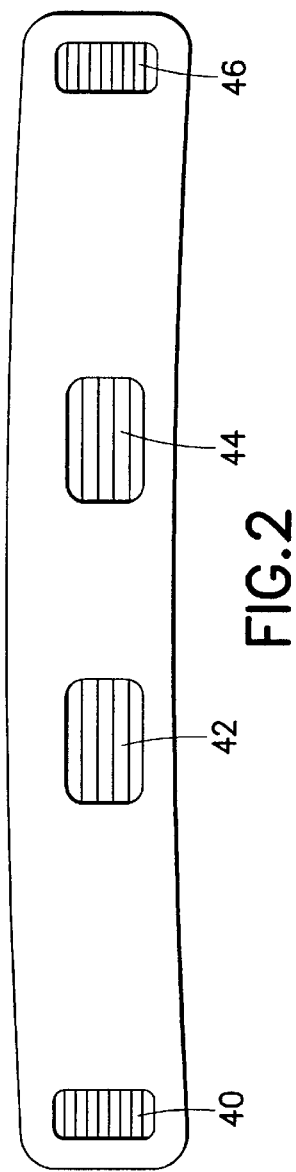
FIG. 2 shows a front view of an exemplary arrangement of face-level outlets for a vehicle air-conditioning system.

Referring additionally to FIG. 2, because left path 10 further divides, the first portion of air is then further divided into a third portion which flows along path 14 from where it flows out into a left-hand side outlet 40 in the vehicle interior, and a fourth portion which makes a further right-angled turn to flow into path 16 from where it flows out into a left-hand centre outlet 42 in the vehicle interior. Similarly, because right path 12 further divides, the second portion of air is then further divided into a fifth portion which flows along path 18 from where it flows out into a right-hand side outlet 46 in the vehicle interior, and a sixth portion which must make a further right-angled turn to flow into path 20 from where it flows out into a right-hand centre outlet 44 in the vehicle interior. These two further right-angled turns result in yet more pressure drop.

Figure 3:
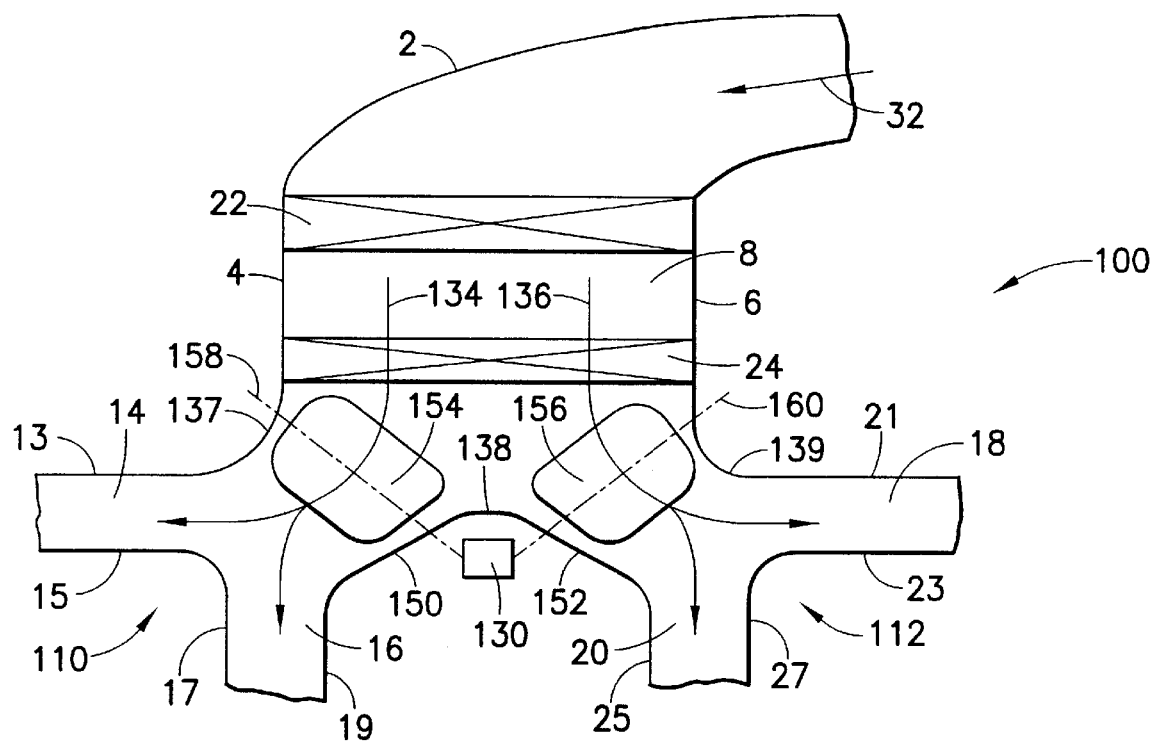
FIG. 3 shows a partial cross-sectional view through a vehicle air-conditioning system incorporating a preferred embodiment of the present invention.

Referring now to FIG. 3, an air-conditioning system incorporating the present invention provides relatively gentle transitions in flow direction. There is provided an air inlet duct 2, leading to a first flow path 8 defined by walls 4 and 6 which house an evaporator 22 and a heater core 24. The first flow path divides into a transverse left path 110 and a transverse right path 112 and is terminated by an end wall 138. The first flow path extends into the transverse left path 110 and transverse right path 112 which are disposed at approximately 45° to first flow path 8, and at approximately 90° to one another. This is achieved by corner portion 137 which extends from wall 4, and wall 150, which together define path 110, and corner portion 139 which extends from wall 6, and 152, which together define path 112. Corner portions 137 and 139 are gently curved in shape. Walls 150 and 152 are connected at their upstream ends by end wall 138.

The left path 110 further divides into a left side path 14 defined by a rear wall 13 and a front wall 15, which is disposed at right-angles to flow path 8, and a left centre path 16, defined by a left wall 17 and a right wall 19, which is disposed parallel to first flow path 8 but laterally offset. Wall 150 extends at its downstream end into wall 19.

Similarly the right path 12 further divides into a right side path 18 defined by a rear wall 21 and a front wall 23, which is disposed at right-angles to flow path 8, and a right centre path 20 defined by a left wall 25 and a right wall 27, which is disposed parallel to flow path 8 but laterally offset. Wall 152 extends at its downstream end into wall 25. Paths 14 and 18 are disposed at 180° to one another.

There are provided a first flow control door 154, which is rotatable about its centre axis 158, and a second flow control door 156 which is rotatable about its centre axis 160. The centre axis 158 of the first door is disposed across the path 110 which is disposed at approximately 45° to first flow path 8 and the centre axis 160 of the second flow door is disposed across the path 112 which is disposed at approximately 45° to first flow path 8. Both doors are rotatable between an open position as shown in FIG. 3, and a closed position. There is provided a common actuator 130 for rotating both doors.

In operation, air enters through inlet duct 2 in the direction of arrow 32 and passes through the device until it reaches the first and second flow control doors 154, 156. It then divides into two portions as indicated by arrows 134 and 136. A first portion follows the direction of arrow 134 into the left path 110 and a second portion follows the direction of arrow 136 into the right path 112. Air hitting end wall 138, will be divided from there to follow the flow paths indicated by either arrow 134 or 136. It can be seen that the shape of the left-hand corner portion 137 and the right-hand corner portion 139 allow both portions of air to make gentle 45° turns in order to flow into paths 110 and 112.

Referring additionally to FIG. 2, as left path 110 further divides, the first portion of air is then further divided into a third portion which makes a further gentle 45° turn to flow along path 14 from where it flows out into a left-hand side outlet 40 in the vehicle interior, and a fourth portion which makes a further gentle 45° turn to flow into path 16 from where it flows out into a left-hand centre outlet 42 in the vehicle interior. Similarly, as right path 112 further divides, the second portion of air is then further divided into a fifth portion which makes a further gentle 45° turn to flow along path 18 from where it flows out into a right-hand side outlet 46 in the vehicle interior, and a sixth portion which makes a further gentle 45° turn to flow into path 20 from where it flows out into a right-hand centre outlet 44 in the vehicle interior. These further 45° turns, coupled with the fact that only a small portion of the air impinges on end wall 138, reduce pressure drop, heat loss and noise. A further advantage of the arrangement is that its total length in the direction of first flow path 8 is small enough for use within a vehicle air-conditioning system.

It is advantageous to have a common actuator 130 for the two doors because, among other things, during installation or maintenance, it is easier to install or access a single actuator in one location, rather than having to install or access two actuators in two separate locations within the vehicle. A single actuator is also more economical to manufacture and assemble than two separate actuators.

Figure 4:
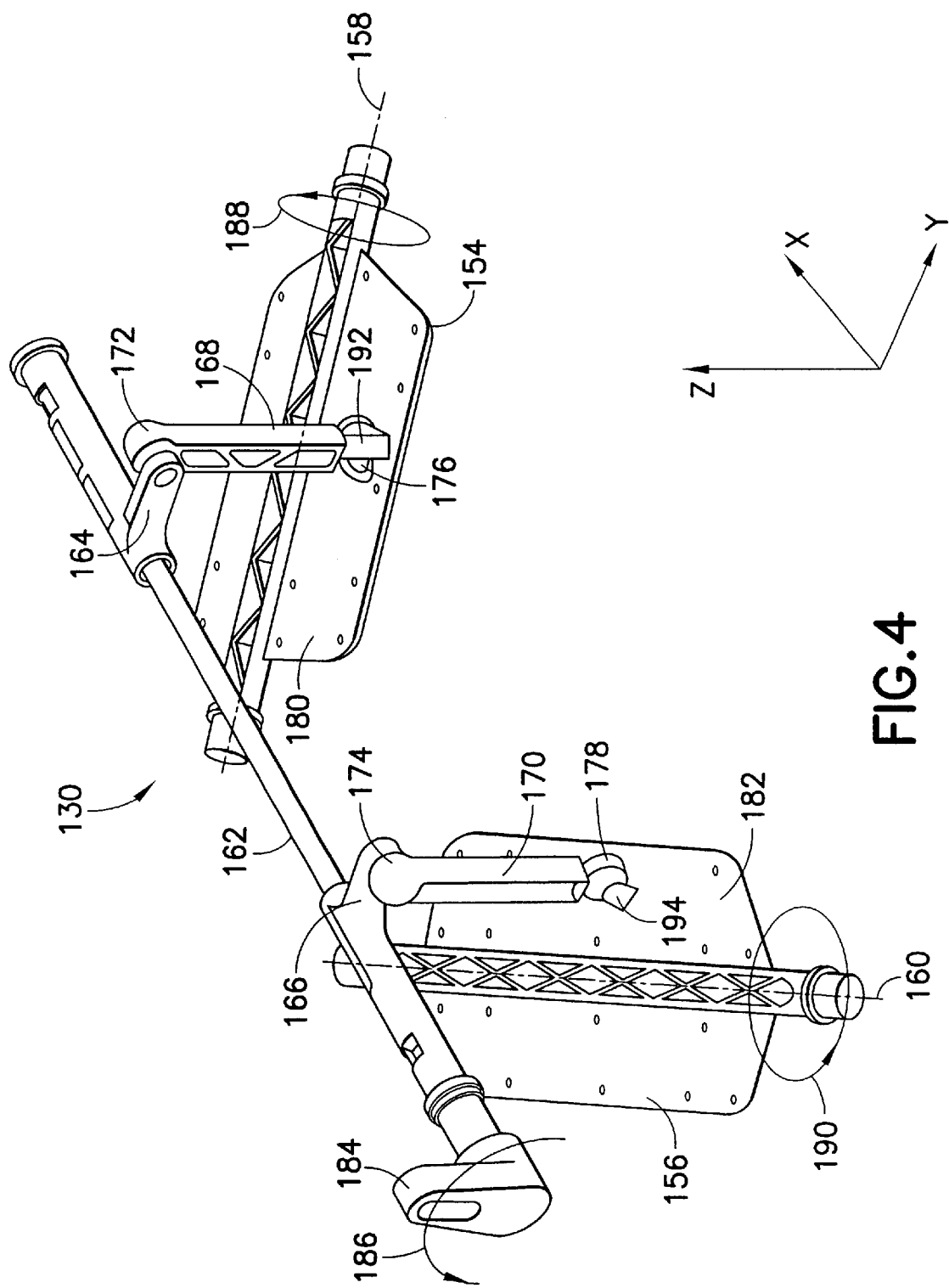
FIG. 4 shows a perspective view of a door control device used in the system of FIG. 3.

Referring now to FIG. 4, actuator 130 provides a mechanism for operating both flow doors 154 and 156 simultaneously. So as to present the most useful view, FIG. 4 is a perspective view looking downstream and from above (out of page) FIG. 3. Therefore, door 154 is the right-hand door and door 156 is the left-hand door in FIG. 4. The mechanism comprises a shaft 162, which has two arms 164, 166 fixedly attached to it. It would also be possible for the shaft and these arms to be formed from a common piece of material. Arm 164 is connected via joint 172 to linkage 168. Linkage 168 is attached to door 154 via joint 176. Considering door 154 to be divided into an upstream half and a downstream half by its centre axis 158, the attachment point of door 154 is approximately in the centre of the upstream half 180 of the door, on the upper surface which is visible in FIG. 3. In this embodiment, the joints 172, 176 are ball and socket joints.

Similarly, arm 166 is connected via joint 174 to linkage 170. Linkage 170 is attached to door 156 via joint 178. Considering door 156 to be divided into an upstream half and a downstream half by its centre axis 160, the attachment point of door 156 is approximately in the centre of the upstream half 182 of the door, on the upper surface which is visible in FIG. 3. In this first embodiment, the joints 174, 178 are ball and socket joints.

The actuator 130 is contained within a housing in the vehicle, but this is omitted from FIG. 4 in the interest of clarity.

As shown in FIG. 4, doors 154, 156 are in the same position as in FIG. 3, that is they are in an open position which allows air to flow past them. In operation, a dashboard control (not shown) operates a connector 184 in a manner known to those skilled in the art, for example with a Bowden cable. The connector 184 rotates the shaft 162 in the direction indicated by arrow 186, which is anti-clockwise in the figure. As shaft 162 rotates, arms 164, 166 rotate with it. This applies motion to linkages 168 and 170 respectively via ball and socket joints 172, 174. Bearing in mind that the doors 154, 156 are constrained on fixed axes, they are only able to rotate about these axes in an anti-clockwise direction as shown by arrows 188, 190 respectively. Due to motion imparted through linkages 168, 170, they are able to rotate sufficiently to close paths 110, 112 to air flow. Due to the angles of the doors relative to the shaft, the linkages 168, 170 undergo a three-dimensional movement during the rotation of the doors. This is made possible by the joints 172, 174 allowing two-dimensional motion in the y-z plane, whilst joints 176, 178 allow two-dimensional motion in the plane of the door.

Figure 5:
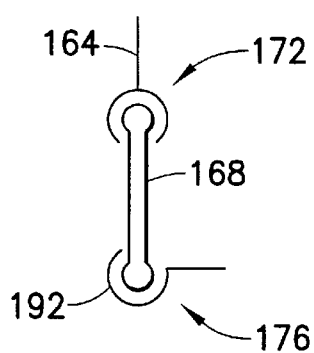
FIG. 5 shows a ball and socket joint for use in the apparatus of FIG. 4.

A detail of linkage 168 and joints 172, 176 is shown in FIG. 5. This shows how arm 164 provides the "socket" in order to constrain joint 172 in the direction of rotation of the shaft and how extension 192 to door 154 also provides a socket to constrain joint 176 in the plane of the door. In order for the necessary motion to be transmitted through linkage 168, it is important that the linkage 168 is held in a fixed position relative to arm 164 whilst still being able to rotate and similarly that the linkage 168 is held in a fixed position on door 154 whilst still being able to rotate. The arm 164 constrains the linkage 168 in a vertical direction in FIGS. 4 and 5 because this is the direction in which the linkage 168 would otherwise move relative to the arm 164. Similarly, the extension 192 prevents the linkage 168 from sliding on the surface of the door 154.

The other linkage 170 works in a similar way with joints 174, 178 during rotation of door 156.

Figure 6:
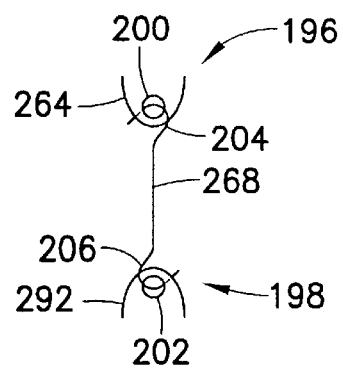
FIG. 6 shows an alternative joint for use in the apparatus of FIG. 4.

In an alternative apparatus, the linkages 168, 170 and joints 172, 174, 176 and 178 are replaced by hook and eye joints. FIG. 6 shows a detail of linkage 268 which used in place of linkage 168, along with its associated joints. This linkage 268 is attached with hook and eye joint 196, which replaces ball and socket joint 172, and by hook and eye joint 198, which replaces ball and socket joint 176. Joint 196 has an eye 200 provided by a modified arm 264, this arm 264 being used in place of arm 164. The linkage 268 has a hook 204 at the end for connection to arm 264, which hooks into eye 200. Extension 192 on door 154 is replaced by extension 292, comprising an eye 202. The linkage 268 has a hook 206 which hooks into eye 202, thus connecting the linkage 268 with door 154.

In operation, the joints 196, 198 work in a similar way to joints 172, 176, allowing linkage 268 to transmit motion to rotate door 154 through three-dimensional movement, by allowing two-dimensional movement of each joint. The joints are constrained relative to arm 264 and door 154 as before. A similar arrangement of hook and eye joints is provided for imparting motion between shaft 162 and door 156. An advantage of this alternative apparatus is that it is especially economical to manufacture and assemble.

It would of course be possible to use other types of joints in place of the joints described above. An example of a different type of joint which would work is a universal joint. The invention is not limited to using one of the mentioned joints.

It would also be possible to use a joint which only allowed one-dimensional movement in place of the joints for attachment to the arms 164, 166, if these arms were capable of sliding along shaft 162, such that the sliding movement would allow the necessary motion in the second dimension. A further possible method of transmitting motion from the shaft to the doors would be to use elastic members which were fixedly attached to the shaft and the doors, which would be capable of deforming in three dimensions, but this might not provide the necessary durability for the lifetime of the vehicle.

Any of the described apparatus including the alternatives mentioned above could be used in a heating only system, in which case the evaporator 22 would not be required.

It would be possible to use the described embodiment and alternatives in a dual-zone system. In this case, the left side paths would be used to supply air to one zone and the right side paths would be used to supply air to the second zone. Under these circumstances it would be necessary to replace actuator 130 with two separate actuators, so that flow to the two zones could be allowed independently. Use of this apparatus would provide the advantage of a gentle flow path.

What is claimed is:

1. Apparatus for distributing air in a motor vehicle, the air flowing along a first path, the apparatus comprising:
    (a) walls defining the first path aligned approximately along the longitudinal center line of the motor vehicle, a second path and a third path, the first path bifurcating into the second and third paths, the second and third paths diverging transversely from the first path towards opposite sides of the longitudinal center line of the motor vehicle and having respective portions disposed at an angle of less than 180° to one another;
    (b) a first door, rotatable about an axis disposed across a portion of the second path;
    (c) a second door, rotatable about an axis disposed across a portion of the third path;
    (d) an operating device for rotating the first door and second door, such that air is able to flow from the first path into the second and third paths, the flow being dependent on the positions of rotation of the first and second doors, respectively; and
    (e) a heater core disposed in the first path, whereby air in the second and third paths is heatable.

2. A vehicle air-conditioning system comprising:
    (a) walls defining a first longitudinally extending path aligned approximately along the longitudinal center line of the vehicle, a second path and a third path, the first path bifurcating into the second and third paths, the second and third paths diverging transversely from the first path towards opposite sides of the longitudinal center line of the vehicle and having respective portions disposed at an angle of less than 180° to one another;
    (b) an evaporator disposed in the first path;
    (c) a heater core disposed in the first path downstream of the evaporator;
    (d) a first door, rotatable about an axis disposed across a portion of the second path;
    (e) walls defining a fourth path and a fifth path, wherein the second path bifurcates into the fourth and fifth paths, the fourth path being offset from the first path and aligned substantially parallel to it, wherein air is able to flow from the second path into the fourth and fifth paths and out into the vehicle interior, flow being dependent on the position of rotation of the first door;
    (f) a second door, rotatable about an axis disposed across a portion of the third path;
    (g) walls defining a sixth path and a seventh path, wherein the third path bifurcates into the sixth and seventh paths, the sixth path being offset from the first path and aligned substantially parallel to it, wherein air is able to flow from the third path into the sixth and seventh paths and out into the vehicle interior, flow being dependent on the position of rotation of the second door.

3. A vehicle air-conditioning system according to claim 2, wherein the fifth and seventh paths are disposed substantially perpendicular to the first path and at substantially 180° to one another.

4. A vehicle air-conditioning system according to claim 2, wherein an operating device is provided for rotating the first and second doors.

5. A vehicle air-conditioning system according to claim 4, wherein the operating device comprises:
    (a) a shift having a longitudinal axis, the shaft being rotatable about the longitudinal axis;
    (b) an actuator for rotating the shaft;
    (c) a first arm extending from the shaft for rotation therewith, the first arm having a distal end;

(d) a first linkage having two ends, one end being connected via a first joint to the distal end of the distal end of the first arm, the first joint permitting relative rotation in two orthogonal planes between the first linkage and the first arm, and the other end being connected via a second joint to the first door, the second joint permitting relative rotation in two orthogonal planes between the first linkage and the first door; and the apparatus further comprising:

(f) a second arm extending from the shaft for rotation therewith, the second arm having a distal end;

(g) a second linkage having two ends, one end being connected via a third joint to the distal end of the second arm, the third joint permitting relative rotation in two orthogonal planes between the second linkage and the second arm, and the other end being connected via a fourth joint to the second door, the fourth joint permitting relative rotation in two orthogonal planes between the second linkage and the second door.

6. A vehicle air-conditioning system according to claim 5, wherein at least one of the rotatable joints comprises a ball and socket joint.

7. A vehicle air-conditioning system according to claim 5, wherein at least one of the rotatable joints comprises a part having an aperture, and a hook which is hooked into the aperture.

8. Apparatus for distributing air into a vehicle cabin, the air flowing along a first path, the apparatus comprising:

(a) means for defining the first path aligned approximately along the longitudinal center line of the vehicle, a second path and a third path, the first path bifurcating into the second and third paths, the second and third paths diverging transversely from the first path towards opposite sides of the longitudinal center line of the motor vehicle and having respective portions disposed at an angle of less than 180° to one another, the second and third paths having exit ends in fluid communication with the vehicle cabin;

(b) means for selectively permitting air flow from the first path into the second path; and (c) means for selectively permitting air flow from the first path into the third path.

9. Apparatus according to claim 8, wherein the means for selectively permitting air flow from the first path to the second path and the means for selectively permitting air flow from the first path to the third path are commonly operated.

10. Apparatus according to claim 8, wherein the means for selectively permitting air flow from the first path to the second path and the means for selectively permitting air flow from the first path to the third path are separately operated.

11. Apparatus according to claim 8, further comprising a means for adjusting the temperature of the air flowing into the vehicle cabin.

12. A method for distributing air from a first path into a vehicle cabin, comprising the steps of:

(a) aligning the first path approximately along the longitudinal center line of the vehicle (b) bifurcating the first path into a second path and a third path, the second path and third path both diverging transversely from the first path towards opposite sides of the longitudinal center line of the vehicle such that the second path and third path are disposed at an angle of less than 180° to one another, the second and third paths having exit ends in fluid communication with the vehicle cabin;

(c) selectively permitting air flow from the first path into the second path; and (d) selectively permitting air flow from the first path into the third path.

13. The method according to claim 12, further comprising the step of bifurcating the second path into a fourth path and a fifth path, the fourth and fifth paths having exit ends in fluid communication with the vehicle cabin.

14. The method according to claim 13, wherein the fourth path is offset from and aligned substantially parallel to the first path.

15. The method According to claim 13, further comprising the step of bifurcating the third path into a sixth path and a seventh path, the sixth and seventh paths having exit ends in fluid communication with the vehicle cabin.

16. The method according to claim 15, wherein the sixth path is offset from and aligned substantially parallel to the first path.

17. The method according to claim 12, further comprising the step of adjusting the temperature of the air flowing into the vehicle cabin.

\* \* \* \* \*